3,528,949
POLYMERS FROM UREAS AND DIHALIDES
Thomas F. Rutledge, Blue Rock Manor, Wilmington, Del., assignor to Atlas Chemical Industries, Inc., Wilmington, Del., a corporation of Delaware
No Drawing. Filed May 7, 1968, Ser. No. 727,352
Int. Cl. C08g 22/02
U.S. Cl. 260—77.5                                     9 Claims

ABSTRACT OF THE DISCLOSURE

Novel polyureas are prepared by reacting a urea with a benzylic or allylic dihalide in the presence of from 0.25 to 3 mols of water per mol of urea. It has been found that the amount of water present during the reaction of ureas with benzylic or allylic dihalides has a substantial effect on the nature of the resulting polyurea. The polyureas of this invention are thermosetting polymers which are useful for the preparation of molded articles.

---

This invention relates to condensation products of ureas and dihalides and to a process for the preparation of such condensation products. More particularly, this invention relates to the preparation of novel polyureas from ureas and benzylic or allylic dihalides.

It has been found, in accordance with this invention, that novel polyureas may be prepared by reacting a urea with a benzylic or allylic dihalide in the presence of from 0.25 to 3 mols of water per mol of urea and preferably from 0.5 to 2.

The polyureas prepared by the process of this invention are polymeric, that is they contain recurring urea and dihalide residues. The reaction may be illustrated by the following equation:

$$\text{H}_2\text{N}-\overset{\overset{\text{O}}{\|}}{\text{C}}-\text{NH}_2 + \text{Cl}-\text{dihalide residue}-\text{Cl} \longrightarrow$$

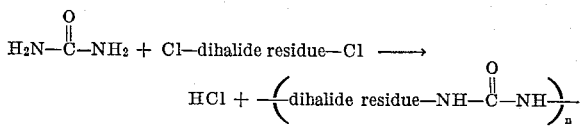

where $n$ is an integer greater than one. Thus, the polyurea prepared from p-xylylene dichloride and urea may be pictured as having the idealized formula

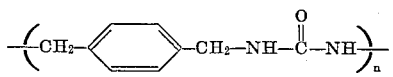

The polyureas prepared with allylic dihalides have a corresponding structure except that the HCl formed adds across about ⅓ of the double bonds present in the polyurea.

In order to obtain the polymeric polyureas of this invention it is essential that the amount of water used is from 01. to 3 mols of water per mol of urea. It has also been found that the amount of water present during the reaction of ureas with benzylic or allylic dihalides has a substantial effect on the yield, nitrogen content and melting point of the reaction product and on the ratio of urea units to dihalide units in the reaction product. When the amount of water present is much above 3 mols of water per mol of urea, the yield, ratio of urea units to dihalide units, melting point, and nitrogen content of the reaction product is lower than when the amount of water is from 0.1 to 3 mols of water per mol of urea. When the amount of water present is much below 0.1 mol of water per mol of urea, the ratio of urea units to dihalide units is higher and the yield is lower than when the amount of water is from 0.1 to 3 mols of water per mol of urea. It is completely unexpected that the amount of water would have such effect on the reaction of ureas with benzylic or allylic dihalides since the water does not enter into the polyurea formed.

Suitable ureas which may be used to prepare the novel polyureas of this invention include the ureas corresponding to the formula

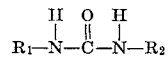

where $R_1$ and $R_2$ are independently selected from the group consisting of H, aryl, aralkyl, and alkyl having from 1 to 12 carbon atoms. Typical examples of such ureas include urea, N-t-butylurea, N-n-butylurea, N,N'-dimethylurea, N-amylurea, N,N'-diethylurea, N,N'-dipropylurea, N,N'-dibutylurea, N-phenylurea, N-hexylurea, N-octylurea, N-laurylurea, N,N'-diphenylurea, N-tolylurea, N,N'-ditolylurea, and N-methyl-N'-phenylurea. A mixture of ureas may also be used. The preferred ureas are urea $$(\text{H}_2\text{N}-\overset{\overset{\text{O}}{\|}}{\text{C}}-\text{NH}_2)$$

and alkyl ureas having from 1 to 5 carbon atoms in the alkyl group.

The halides which may be used to prepare the novel polyureas of this invention are the benzylic and allylic dihalides, that is compounds containing two halogen atoms attached through methylene groups to different aromatic or olefinic carbon atoms. A preferred class of these dihalides is represented by the formula $(\text{X CH}_2)_2\text{R}$ wherein X is chlorine, bromine, or iodine and R is arylene,

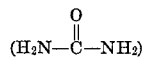

where R' and R" are hydrogen, methyl, or ethyl, alkylarylen, or

where R''' is oxa, sulfonyl, imino, or alkylene. Illustrative examples of benzylic and allylic dihalides include p-xylylene dichloride, m-xylylene dichloride, dichloromethylpropylbenzene, 1,4-dichlorobutene-2, 1,4-dichloro-2-methyl-butene-2, 2,2-methyl-p-xylylene dichloride, 1,8-dichloro-2,6-octadiene, diiodomethyl-methylbenzene, bis (chloromethylphenyl) oxide, bis (chloromethylphenyl) sulfone, bis (chloromethylphenyl) imine, bis (chloromethylphenyl) methane, 2,2-bis(chloromethylphenyl) propane, 1,4-dichloro-2-ethylbutene-2, p-xylylene dibromide, α, α', 2,3,5,6-hexachloro-p-xylylene. The preferred dihalide is p-xylene dichloride. A mixture of benzylic and/or allylic dihalides may be used.

The condensation reaction of the urea and dihalide may be carried out by merely contacting the urea with the dihalide and heating the mixture until the reaction proceeds at a satisfactory rate. The particular temperature, length of reaction, and amount of urea and dihalide used may vary over a wide range. In general, suitable results may be obtained with reaction temperatures from about 80° C. to about 150° C. and reaction times from about 2 hours to about 20 hours. Although lower temperatures and longer reaction times and higher temperatures and shorter reaction times may be used, no advantage is gained thereby. The molar ratio of urea to dihalide is suitably from 1 to 3 and preferably from 2 to 2.2. Although higher and lower molar ratios may be used, no advantage is gained thereby. Lower molar ratios result in unreacted dihalide and higher molar ratio result in unreacted urea.

The condensation reaction of the dihalide and urea may be conducted either in the presence or absence of inert organic diluents and at atmospheric, superatmospheric, or subatmospheric pressures. The reaction is pref-

| Ex. No. | Urea | Charge | | | | | | Conditions | | | Polymer Analysis | | |
|---|---|---|---|---|---|---|---|---|---|---|---|---|---|
| | | Grams of urea | Dihalide | Urea[1]/ dihalide | Water[1]/ urea | Diluent[2] | Surfactant[3] | Protective[3] colloid | Time, hours | Tempera- ture, °C. | Conver- sion, mol percent[4] | Percent N / Cl | Urea units[5]/ dihalide units |
| 1 | NH₂—C(=O)—NH₂ | 66 | p-Xylylene dichloride | 2.2 | 0.5 | Kerosene | Sorbitan monooleate | Bentone-34[6] | 6½ | 125 | 83 | 19.1 / 0.92 | 1.7 |
| 2 | Same as above | 66 | do | 0.5 | 2.0 | do | do | | 6½ | 90 | 44 | 21.3 / 1.7 | 1.45 |
| A | do | 89 | do | 0.5 | | Water | Polyoxylene (20) sorbi- tan monooleate. | Bentone-34 | 6½ | 90 | 54 | 10.5 / 7.1 | 0.66 |
| 3 | NH₂—C(=O)—NH₂ | 45 | p-Xylylene dichloride | 3.0 | 0.5 | Nitrobenzene | Sorbitan monooleate | Acrysol[7] | 5 | 110 | 70.6 | 21.3 / 0.94 | 1.4 |
| 4 | Same as above | 66 | do | 2.0 | 2.3 | Xylylene | do | | 14 | 100 | 51 | 22.4 / 0.18 | 1.3 |
| 5 | do | 45 | do | 3.0 | 1.5 | Kerosene | (3) | Acrysol | 3 | 110 | 36 | | |
| 6 | do | 66 | do | 2.2 | 2.6 | do | do | | 12 | 115 | 75 | 19.4 / 1.46 | 1.36 |
| 7 | do | 66 | 1,4-dichlorobutene-2 | 2.2 | 0.5 | do | do | | 13½ | 125 | | 25.1 / 8.5 | |
| 8 | do | 66 | 0.25 mol p-xylylene dichloride plus 0.25 mol 1,4- dichlorobutene-2. | 2.2 | 0.5 | do | do | | 13½ | 125 | 80 | 20.8 / 2.2 | |
| 9 | do | 33 | Di(chloromethyl) diphenyl oxide | 2.2 | 0.5 | do | Sorbitan monooleate | Bentone-34 | 16 | 110–130 | 87 | 12.1 / 0.9 | 1.1 |
| B | do | 89 | do | 1.5 | | Water | | | 8 | 95 | 98 | 7.5 / 0.76 | 0.66 |
| 10 | t-Butylurea | 63.8 | Di(chloromethyl) diphenyl oxide | 2.2 | 0.5 | Kerosene | Sorbitan monooleate | Bentone-34 | 6½ | 125 | 83.5 | 10.0 / 3.2 | 1.2 |
| 11 | do | 63.8 | p-Xylylene dichloride | 2.2 | 0.5 | do | do | do | 6½ | 125 | 69 | 13.8 / 4.4 | 1.6 |
| 12 | Biurea | 29.5 | do | 2.0 | 0.5 | do | do | do | 6½ | 115 | 51 | 29.2 / 0 | 1.37 |

[1] Mol Ratio.
[2] 200 ml.
[3] 2% by weight of total charge.
[4] Based on mols of dihalide charged.
[5] Ratio of urea units and dihalide units in polymers.
[6] Organic derivatives of hydrous magnesium aluminum silicate minerals—sold by National Lead Co.
[7] Sodium polyacrylate—sold by Rohm & Haas Co.
[8] Mixture of 76% sorbitan trioleate and 24% polyoxyethylene (20) sorbitan trioleate.

erably conducted in the presence of an inert organic diluent to facilitate removal of the reaction product from the reactor. The only requirements for the organic diluent is that it be inert under the conditions of reaction and that it have a boiling point high enough to allow attainment of a suitable reaction temperature. Illustrative examples of such inert organic diluents are kerosene, xylylene, and nitrobenzene. The preferred organic diluent is kerosene.

When the reaction is conducted in the presence of an inert organic diluent, removal of the reaction product from the reactor may be further facilitated by using a surfactant or protective colloid, for example, sorbitan trioleate, sorbitan monooleate, polyacrylic acid, and Bentone clays.

The following numbered examples are illustrative of the preparation of polyureas pursuant to the present invention. It will be appreciated, of course, that the proportions of reacting ingredients, times of reaction, and temperatures of reaction are variable; and selection of different ureas and benzylic and allylic dihalides can readily be effected in the light of the guiding principles and teachings which are disclosed herein. The examples, therefore, are not in any way to be construed as limitative of the scope of the processes and products of the present invention.

The following procedure was employed in Examples 1–12, A and B. The indicated amount of urea, dihalide, diluent, water, surfactant, and protective colloid were added to a 500 ml. flask fitted with a stirrer, reflux condenser connected to a sodium hydroxide scrubber, nitrogen inlet, and thermometer. The stirrer and nitrogen were turned on and the contents of the flask heated to the indicated temperature. The temperature was maintained for the indicated length of time and then the reaction mixture was cooled to room temperature. The solid polymer formed was removed by filtering the reaction mixture. The solid polymer was washed with ethanol and water, dried overnight at 100° C., and analyzed. Numbered examples are in accordance with the present invention, those designated by letter are presented for purposes of comparison.

The polyureas of this invention are thermosetting polymers which may be cured by heating to 200–300° C. The polyureas may also be cured chemically by heating them with any bifunctional reagent which will react with urea groups, such as formaldehyde, other aldehydes, dealdehydes, diketones, allylic or benzylic dihalides, diamines, diisocyanates, and diureas.

The polyureas of this invention are useful for the preparation of molded articles of all kinds by standard techniques. For example, the powdered condensation product of the dihalide and urea may be placed into a mold and heated to 200 to 300° C. to form a very hard, resilient, flame resistant molded article.

Although this invention has been described with reference to particular embodiments and examples, it will be apparent to those skilled in the art that variations and modifications thereof can be made without departing from the principles and true spirit of the invention.

Having described the invention, what is desired to be protected by Letters Patent is:

1. A process for the preparation of polyureas by reacting at least one urea of the formula

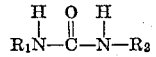

wherein $R_1$ and $R_2$ are independently selected from the group consisting of H, aryl, aralkyl, and alkyl containing from 1 to 12 carbon atoms with at least one dihalide of the formula $(XCH_2)_2 R$ wherein X is chlorine, bromine, or iodine and R is arylene,

where R' and R" are hydrogen, methyl, or ethyl, alkylarylene, or

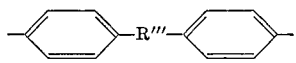

where R''' is oxa, sulfonyl, imino, or alkylene, wherein the improvement comprises carrying out the reaction in the presence of from 0.25 to 3 moles of water per mole of urea.

2. A process of claim 1 wherein the reaction is carried out in an inert organic diluent.

3. A process of claim 2 wherein $R_1$ and $R_2$ are hydrogen.

4. A process of claim 3 wherein the dihalide is para-xylylene dichloride or 1,4-dichlorobutene-2.

5. A process of claim 2 wherein the mole ratio of water to urea is 0.5 to 2.

6. A process of claim 2 wherein the temperature is from 80° C. to 150° C.

7. A process of claim 4 wherein the inert organic diluent is kerosene, the mole ratio of water to urea is from 0.5 to 2, and the temperature is from 80° C. to 150° C.

8. A product prepared by the process of claim 1.

9. A product prepared by the process of claim 2.

References Cited

UNITED STATES PATENTS 3,329,653   7/1967   Beavers et al. _____ 260—47

FOREIGN PATENTS 886,430   10/1943   France.
946,087   1/1964   Great Britain.

DONALD E. CZAJA, Primary Examiner

H. S. COCKERAM, Assistant Examiner

U.S. Cl. X.R.

260—65, 68, 69